United States Patent
Bae et al.

(10) Patent No.: US 11,180,583 B2
(45) Date of Patent: Nov. 23, 2021

(54) POLYALPHAOLEFIN HAVING UNIFORM STRUCTURE AND METHOD OF PREPARING SAME

(71) Applicant: DL Chemical CO., LTD., Seoul (KR)

(72) Inventors: Hee Sun Bae, Daejeon (KR); Jae Hoon Uhm, Daejeon (KR); Tae Hee Lee, Daejeon (KR); Jeong Oh Woo, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 91 days.

(21) Appl. No.: 16/687,825

(22) Filed: Nov. 19, 2019

(65) Prior Publication Data

US 2020/0165362 A1 May 28, 2020

(30) Foreign Application Priority Data

Nov. 27, 2018 (KR) .................. 10-2018-0148623

(51) Int. Cl.
| | | |
|---|---|---|
| *C10M 107/10* | (2006.01) | |
| *C08F 10/14* | (2006.01) | |
| *C10N 20/00* | (2006.01) | |
| *C10N 20/02* | (2006.01) | |
| *C10N 20/04* | (2006.01) | |

(52) U.S. Cl.
CPC .......... *C08F 10/14* (2013.01); *C10M 107/10* (2013.01); *C10M 2205/0285* (2013.01); *C10N 2020/02* (2013.01); *C10N 2020/04* (2013.01); *C10N 2020/071* (2020.05)

(58) Field of Classification Search
CPC ................ C08F 10/14; C10M 107/10; C10M 2205/0285; C10N 2020/071; C10N 2020/02; C10N 2020/04; C10N 2060/02
See application file for complete search history.

(56) References Cited

U.S. PATENT DOCUMENTS

| | | | |
|---|---|---|---|
| 4,041,098 A | 8/1977 | Loveless | |
| 8,143,467 B2 | 3/2012 | Patil et al. | |
| 2003/0055184 A1* | 3/2003 | Song ................... | C10M 143/08 526/160 |

(Continued)

FOREIGN PATENT DOCUMENTS

| | | |
|---|---|---|
| JP | 4914894 B2 | 4/2012 |
| KR | 10-2012-0035164 A | 4/2012 |

(Continued)

OTHER PUBLICATIONS

Shubkin, "Polyalphaolefins", CRC Handbook of Lubrication and Tribology, vol. III Monitoring, Materials, Synthetic Lubricants, and Applications, 1994, pp. 219-235 (19 pages total).

(Continued)

*Primary Examiner* — Ellen M McAvoy
(74) *Attorney, Agent, or Firm* — Sughrue Mion, PLLC

(57) ABSTRACT

The present invention relates to a polyalphaolefin having a uniform structure and a method of preparing the same, and more particularly to a method of preparing polyalphaolefin having a uniform comb-like structure by minimizing the formation of short chain branches, which deteriorate the properties of lubricant base oil, using a homogeneous single-active-site metallocene catalyst, an organometallic compound cocatalyst and an organoboron compound promoter.

7 Claims, 1 Drawing Sheet

(56) References Cited

U.S. PATENT DOCUMENTS

| | | | |
|---|---|---|---|
| 2010/0292424 A1* | 11/2010 | Wu | C10M 107/10 |
| | | | 526/170 |
| 2011/0178348 A1* | 7/2011 | Heilman | C10G 50/02 |
| | | | 585/17 |
| 2012/0040878 A1* | 2/2012 | Katayama | C08F 10/00 |
| | | | 508/591 |
| 2014/0323665 A1* | 10/2014 | Wu | C10G 69/126 |
| | | | 525/338 |
| 2014/0378720 A1 | 12/2014 | Wu et al. | |
| 2018/0016204 A1* | 1/2018 | Coffin | C07C 2/08 |
| 2018/0265799 A1* | 9/2018 | Small | C07C 9/15 |
| 2019/0119597 A1* | 4/2019 | Sunagawa | C10M 129/68 |
| 2019/0359745 A1* | 11/2019 | Chen | C08F 8/04 |
| 2020/0102519 A1* | 4/2020 | Oumar-Mahamat | |
| | | | C10M 105/04 |

FOREIGN PATENT DOCUMENTS

| | | |
|---|---|---|
| KR | 10-2012-0123063 A | 11/2012 |
| WO | 2010074233 A1 | 7/2010 |
| WO | 2011093295 A1 | 8/2011 |

OTHER PUBLICATIONS

Communication dated Mar. 30, 2020 by the European Patent Office in application No. 19209246.8.
Communication dated Nov. 4, 2020 by the Japanese Patent Office in application No. 2019-208951.

\* cited by examiner

POLYALPHAOLEFIN HAVING UNIFORM STRUCTURE AND METHOD OF PREPARING SAME

CROSS-REFERENCE TO RELATED APPLICATIONS

This application is based on and claims priority from Korean Patent Application No. 10-2018-0148623, filed on Nov. 27, 2018 with the Korean Intellectual Property Office, the disclosure of which is incorporated herein in its entirety by reference.

BACKGROUND OF THE INVENTION

1. Technical Field

The present invention relates to a polyalphaolefin having a uniform structure and a method of preparing the same, and more particularly to a method of preparing polyalphaolefin having a uniform comb-like structure by minimizing the formation of short chain branches, which deteriorate the properties of lubricant base oil, using a homogeneous single-active-site metallocene catalyst, an organometallic compound cocatalyst and an organoboron compound promoter.

2. Description of the Related Art

In general, a lubricant is composed of a lubricant base oil and additives for improving the properties thereof, and lubricant base oil is typically divided into mineral oil and synthetic oil. Mineral oil refers to naphthenic oil produced in the process of separating and refining crude oil, and synthetic oil refers to polyalphaolefins (PAOs) manufactured by polymerizing alphaolefins produced during refining of petroleum.

Conventionally, mineral oil is mainly used as lubricant base oil, but as industry develops, lubricants having high performance are required in order to withstand the high performance, high power output, and harsh operating conditions of internal combustion engines and industrial machinery. Such high-performance lubricant has to possess good lubricity in cryogenic environments, to produce an appropriate oil film at high temperatures, to minimize the generation of sludge due to volatilization, and to ensure high shear stability by preventing viscosity from decreasing due to shear stress during engine operation. In particular, as environmental problems have arisen recently, the development of lubricant that may be used for a long time is required, and moreover, a lubricant for equipment that is difficult to maintain and repair, such as gear oil for wind turbines, must essentially have high shear stability for long-term use.

In the case in which a conventional lubricant is used therefor, however, shear force is applied to the lubricant over time, whereby molecules are cleaved, undesirably lowering the viscosity of the lubricant. With the goal of solving this problem, gear oil in which the initial viscosity is increased in proportion to the expected period of use is manufactured. However, if a lubricant having high shear stability is used, it is not necessary to increase the viscosity of gear oil, thereby reducing the resistance of the equipment and thus exhibiting high efficiency. Hence, in recent years, the demand for polyalphaolefin having high shear stability and enabling use thereof in a wide range of environmental conditions, particularly at low temperatures, is increasing because of the high viscosity index and superior fluidity thereof at low temperatures compared to lubricant base oil produced from mineral oil.

Polyalphaolefin is synthetic oil suitable for use as base oil for industrial oil or automotive engine oil, which has to function for a long time by virtue of the superior stability thereof at high temperatures. Polyalphaolefin is typically prepared using a Friedel-Craft catalyst, such as aluminum trichloride ($AlCl_3$) or boron trifluoride ($BF_3$), which is added with an organic alkyl halide, an alcohol or an ester activator (promoter). In connection therewith, U.S. Pat. No. 4,041,098 discloses a method of preparing polyalphaolefin using a catalyst including aluminum trichloride and alkyl halide, and U.S. Pat. No. 8,143,467 discloses a method of preparing polyalphaolefin using an ionic liquid catalyst such as ammonium and phosphonium.

However, the polyalphaolefin prepared by the above method has short chain branches due to a cationic reaction mechanism, and thus the base oil properties of polyalphaolefin may deteriorate, which is undesirable. Therefore, the present inventors have developed a method of preparing polyalphaolefin having a high viscosity index as well as a uniform comb-like structure by minimizing the formation of short chain branches using a metallocene catalyst.

CITATION LIST

Patent Literature (Patent Document 1) U.S. Pat. No. 4,041,098
(Patent Document 2) U.S. Pat. No. 8,143,467

SUMMARY OF THE INVENTION

Accordingly, an objective of the present invention is to provide a method of preparing polyalphaolefin, which is capable of minimizing the formation of short chain branches using a homogeneous single-active-site metallocene catalyst, an organometallic compound cocatalyst and a boron compound promoter.

Another objective of the present invention is to provide a polyalphaolefin having a uniform comb-like structure and a high viscosity index obtained by the above method.

In order to accomplish the above objectives, the present invention provides a polyalphaolefin, which is a hydrogenated polyalphaolefin including at least one hydrogenated alphaolefin oligomer, and satisfying Expression (1) below.

$$\frac{\text{End Carbon}}{\alpha \text{ Carbon}} \leq 2.7 \tag{1}$$

Preferably, the polyalphaolefin satisfies Expression (2) below.

$$1.3 \leq \frac{\text{End Carbon}}{\alpha \text{ Carbon}} \leq 2.7 \tag{2}$$

Here, the end carbon/α carbon ratio represents the relative ratio of integrals at 14 to 16 ppm and 40 to 42 ppm in a $^{13}$C NMR spectrum.

The polyalphaolefin may have a weight average molecular weight (Mw) of 15,000 or less and a molecular weight distribution (Mw/Mn) of 2.0 or less.

The polyalphaolefin may have a kinematic viscosity at 100° C. of 200 cSt or less and a viscosity index of 220 or less.

The polyalphaolefin may have a pour point of −35° C. or less and a flash point of 230° C. or more.

The polyalphaolefin may have a residual metal content of 5 ppm or less.

Hereinafter, a detailed description will be given of the present invention.

In order to accomplish the above objectives, the present invention provides a polyalphaolefin satisfying Expression (1) below.

$$\frac{\text{End Carbon}}{\alpha \text{ Carbon}} \leq 2.7 \quad (1)$$

Preferably, the polyalphaolefin satisfies Expression (2) below.

$$1.3 \leq \frac{\text{End Carbon}}{\alpha \text{ Carbon}} \leq 2.7 \quad (2)$$

More preferably, the polyalphaolefin satisfies Expression (3) below.

$$1.3 \leq \frac{\text{End Carbon}}{\alpha \text{ Carbon}} \leq 1.7 \quad (3)$$

Here, the end carbon/α carbon ratio represents the relative ratio of integrals at 14 to 16 ppm and 40 to 42 ppm in the $^{13}$C NMR spectrum.

In the polyalphaolefin of the present invention, the number of end carbons is almost the same as the number of α carbons, and the formation of short chain branches is suppressed, resulting in a high viscosity index.

The polyalphaolefin is produced by polymerizing a C6-C20 alphaolefin in the presence of a catalyst composition including a metallocene compound, an organometallic compound, and an organoboron compound.

In the present invention, the C6-C20 alphaolefin constituting the polyalphaolefin may be any one or a mixture of two or more selected from the group consisting of 1-hexene, 1-octene, 1-nonene, 1-decene, 1-undecene, 1-dodecene, 1-tricene, 1-tridecene, 1-tetradecene, 1-pentadecene, 1-hexadecene, 1-heptadecene, 1-octadecene, 1-nonadecene and 1-eicosene. When any one alphaolefin is used, it is preferably 1-octene, which is inexpensive, does not deteriorate viscosity properties, and has superior low-temperature properties. If the number of carbon atoms in a single alphaolefin structure is less than 6, viscosity properties may drastically decrease. On the other hand, if the number of carbon atoms exceeds 20, desirable viscosity properties may be obtained but the interaction between side chains with respect to shear stress from the outside increases relative thereto, which may cause molecular cleavage, undesirably lowering shear stability. Alternatively, when two or more alphaolefins are used, the use of 1-octene and another alphaolefin, which are mixed together, is more preferable. The use of the mixture of 1-octene and another alphaolefin facilitates the preparation of polyalphaolefin in which both viscosity properties and low-temperature properties are superior at low cost.

The metallocene catalyst may be at least one selected from the group consisting of ethylenebis(indenyl) zirconium dichloride, ethylenebis(1-indenyl) titanium dichloride, ethylenebis(4,5,6,7-tetrahydroindenyl) zirconium dichloride, dimethylsilylene bis(tetrahydroindenyl) zirconium dichloride, dimethylsilylene bis(cyclopentadienyl) zirconium dichloride, dimethylsilylene bis(methylcyclopentadienyl) zirconium dichloride, dimethylsilylene bis(2,4-dimethylcyclopentadienyl) zirconium dichloride, dimethylsilylene bis (2,3,5-trimethylcyclopentadienyl) zirconium dichloride, dimethylsilylene bis(methyl-tert-butylcyclopentadienyl) zirconium dichloride, dimethylsilylene bis(di-tert-butylcyclopentadienyl) zirconium dichloride, diphenylsilylene bis(cyclopentadienyl) zirconium dichloride, diphenylsilylene bis (methylcyclopentadienyl) zirconium dichloride, diphenylsilylene bis(2,4-dimethylcyclopentadienyl) zirconium dichloride, diphenylsilylene bis(2,3,5-trimethylcyclopentadienyl) zirconium dichloride, diphenylsilylene bis (methyl-tert-butylcyclopentadienyl) zirconium dichloride, diphenylsilylene bis(di-t-butylcyclopentadienyl) zirconium dichloride, isopropylidene bis(cyclopentadienyl) zirconium dichloride, isopropylidene bis(indenyl) zirconium dichloride, dimethylsilylene bis(indenyl) zirconium dichloride, dimethylsilylene bis(2-methylindenyl) zirconium dichloride, dimethylsilylene bis(2-methyl-4,5-benzoindenyl) zirconium dichloride, dimethylsilylene bis(2-methyl-4-phenylindenyl) zirconium dichloride, dimethylsilylene bis(2-methyl-4-naphthylindenyl) zirconium dichloride, dimethylethylene bis(2-methylindenyl) zirconium dichloride, dimethylethylene bis(2-methyl-4,5-benzoindenyl) zirconium dichloride, dimethylethylene bis(2-methyl-4-phenylindenyl) zirconium dichloride, dimethylethylene bis(2-methyl-4-naphthylindenyl) zirconium dichloride, isopropylidene(3-tert-butyl-5-methyl-cyclopentadienyl) (fluorenyl) zirconium dichloride, isopropylidene(3-tert-butyl-5-methyl-cyclopentadienyl)(3,6-di-tert-butylfluorenyl) zirconium dichloride, isopropylidene(3-tert-butyl-5-methyl-cyclopentadienyl)(fluorenyl) zirconium dichloride, isopropylidene(3-tert-butylcyclopentadienyl)(fluorenyl) zirconium dichloride, isopropylidene(3-tert-butyl-5-methyl-cyclopentadienyl)(octamethyl octahydrodibenzofluorenyl) zirconium dichloride, diphenylmethylene(3,5-dimethyl-cyclopentadienyl) (fluorenyl) zirconium dichloride, diphenylmethylene(3,5-dimethyl-cyclopentadienyl)(2,7-di-tert-butylfluorenyl) zirconium dichloride, diphenylmethylene(3,5-dimethyl-cyclopentadienyl)(3,6-di-tert-butylfluorenyl) zirconium dichloride, diphenylmethylene(3,5-dimethyl-cyclopentadienyl) (octamethyl octahydrodibenzofluorenyl) zirconium dichloride, diphenylmethylene(3-tert-butyl-5-methyl-cyclopentadienyl) (fluorenyl) zirconium dichloride, diphenylmethylene(3-tert-butyl-5-methyl-cyclopentadienyl) (2,7-di-tert-butylfluorenyl) zirconium dichloride, diphenylmethylene(3-tert-butyl-5-methyl-cyclopentadienyl)(3,6-di-tert-butylfluorenyl) zirconium dichloride and diphenylmethylene(3-tert-butyl-5-methyl-cyclopentadienyl) (octamethyl octahydrodibenzofluorenyl) zirconium dichloride. Preferably useful is dimethylsilylene bis(tetrahydroindenyl) zirconium dichloride.

The organometallic compound may be at least one selected from the group consisting of an organoaluminum compound, an organomagnesium compound, an organozinc compound and an organolithium compound. Preferably useful is an organoaluminum compound.

For example, the organoaluminum compound may be at least one selected from the group consisting of trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, triisobutylaluminum, tricyclopentylaluminum, tripentylaluminum, triisopentylaluminum, ethyldimethylaluminum, methyldiethylaluminum, triphenylaluminum, methylaluminoxane, ethylaluminoxane, isobutylaluminoxane and butylaluminoxane. Preferably useful is triisobutylaluminum.

The organoboron compound may be at least one selected from the group consisting of trimethylammonium tetraphenylboron, triethylammonium tetraphenylboron, tripropylammonium tetraphenylboron, tributylammonium tetraphenylboron, trimethylammonium tetra(p-tolyl)boron, tripropylammonium tetra(p-tolyl)boron, trimethylammonium tetra(o,p-dimethylphenyl)boron, triethylammonium tetra(o,p-dimethylphenyl) boron, trimethylammonium tetra (p-trifluoromethylphenyl)boron, tributylammonium tetra(p-trifluoromethylphenyl)boron, tributylammonium tetrapentafluorophenylboron, N,N-diethylanilinium tetraphenylboron, N,N-dimethylanilinium tetrapentafluorophenylboron, N,N-diethylanilinium tetrapentafluorophenylboron, diethylammonium tetrapentafluorophenylboron, triphenylphosphonium tetraphenylboron, trimethylphosphonium tetraphenylboron, triphenylcarbonium tetraphenylboron, triphenylcarbonium tetra(p-trifluoromethylphenyl)boron and triphenylcarbonium tetrapentafluorophenylboron. Preferably useful is N,N-dimethylanilinium tetrapentafluorophenylboron.

Meanwhile, the content ratio of the metallocene catalyst, the organometallic compound and the organoboron compound constituting the catalyst composition of the present invention may be determined in consideration of the catalytic activity thereof. Preferably, the molar ratio of the metallocene catalyst, the organoboron compound, and the organometallic compound is controlled in the range of 1:1:5 to 1:10:1000, which is advantageous for ensuring catalytic activity.

Moreover, the components constituting the catalyst composition may be added to an appropriate solvent at the same time or in any order to thus function as a catalyst system having activity. Here, the solvent may be at least one selected from the group consisting of aliphatic solvents such as hexane, heptane, octane, nonane, decane, undecane, dodecane, tridecane, tetradecane, pentadecane and hexadecane, and aromatic solvents such as benzene, toluene, o-xylene, m-xylene, p-xylene, ethylbenzene, isopropylbenzene and n-butylbenzene. Preferably useful is an aromatic solvent.

The weight average molecular weight (Mw) of the polyalphaolefin required in the present invention is 15,000 or less. If the weight average molecular weight thereof exceeds 15,000, kinematic viscosity is increased and thus the resulting polyalphaolefin is unsuitable for use as a lubricant, which is undesirable. Also, the molecular weight distribution (Mw/Mn) of the polyalphaolefin is 2.0 or less, and preferably 1.7 or less. If the molecular weight distribution thereof exceeds 2.0, there is a concern that the shear stability of the polyalphaolefin may decrease, which is undesirable.

The kinematic viscosity of the polyalphaolefin required in the present invention is 220 cSt or less at 100° C., preferably 10 to 220 cSt, and more preferably 10 to 150 cSt. If the kinematic viscosity thereof is less than 10 cSt, the resulting polyalphaolefin makes it difficult to apply to high-viscosity lubrication products such as gear oil, turbine oil and the like. On the other hand, if the kinematic viscosity thereof exceeds 220 cSt, the resulting polyalphaolefin is unsuitable for use as a lubricant because of the very low fluidity thereof.

The pour point of the polyalphaolefin required in the present invention is −35° C. or less, and preferably −40° C. or less. If the pour point thereof exceeds −35° C., the fluidity at low temperatures may be excessively lowered, which is undesirable.

The viscosity index of the polyalphaolefin required in the present invention is 220 or less, and the flash point thereof is 230° C. or more. Preferably, the viscosity index is 205 or less and the flash point is 240° C. or more.

The polyalphaolefin required in the present invention is a hydrogenated (substantially saturated) heavy alphaolefin oligomer aggregate, in which unreacted monomers in the oligomer product resulting from monomer oligomerization and alphaolefin dimers and some or all of trimers generated through the oligomerization are removed. Heavy oligomers containing monomers or dimers are undesirable because they cause a low flash point and high Noack volatility.

Moreover, the polyalphaolefin of the present invention has a bromine number of 0.1 or less. If the bromine number thereof is greater than 0.1, chemical stability may deteriorate due to unsaturated double bonds remaining in polyalphaolefins, it is easy to generate foreign substances due to high reactivity, and yellowing of the lubricant may occur.

In order to control the properties of the polyalphaolefin required in the present invention, controlling the process of polymerizing the metallocene compound, the organometallic compound and the organoboron compound is regarded as of primary importance, and the polymerization temperature during the polymerization is preferably 50 to 85° C. If the polymerization temperature is lower than 50° C., the kinematic viscosity and pour point may increase, which is undesirable. On the other hand, if the polymerization temperature is higher than 85° C., the kinematic viscosity and pour point are superior but short side branches may be formed, and thus the end carbon/a carbon ratio exceeds 2.7, making it difficult to prepare polyalphaolefin having a uniform structure.

Furthermore, in the preparation of the polyalphaolefin having a uniform structure required in the present invention, controlling the catalyst including the metallocene compound, the organometallic compound and the organoboron compound is considered to be of primary importance, and the molar ratio of alphaolefin (mol)/metallocene (mol) catalyst introduced during the polymerization is 130,000 or more. If the metallocene catalyst is excessively introduced, an extremely rapid reaction may occur, making it difficult to produce polyalphaolefin having a uniform structure. In the case of polyalphaolefin produced at the molar ratio in the above range, the metal component in the polyalphaolefin product may be removed to the level of ones of ppm or less through extraction alone without filtration, centrifugation or using a solid adsorbent (alumina, acid, clay, celite, etc.) for removing a catalyst residue in the course of treatment after the polymerization.

According to the present invention, the method of preparing polyalphaolefin is capable of minimizing the formation of short chain branches that deteriorate the properties of lubricant base oil. Therefore, it is possible to prepare a polyalphaolefin having a uniform comb-like structure and a high viscosity index.

DESCRIPTION OF SPECIFIC EMBODIMENTS

Figure 1:
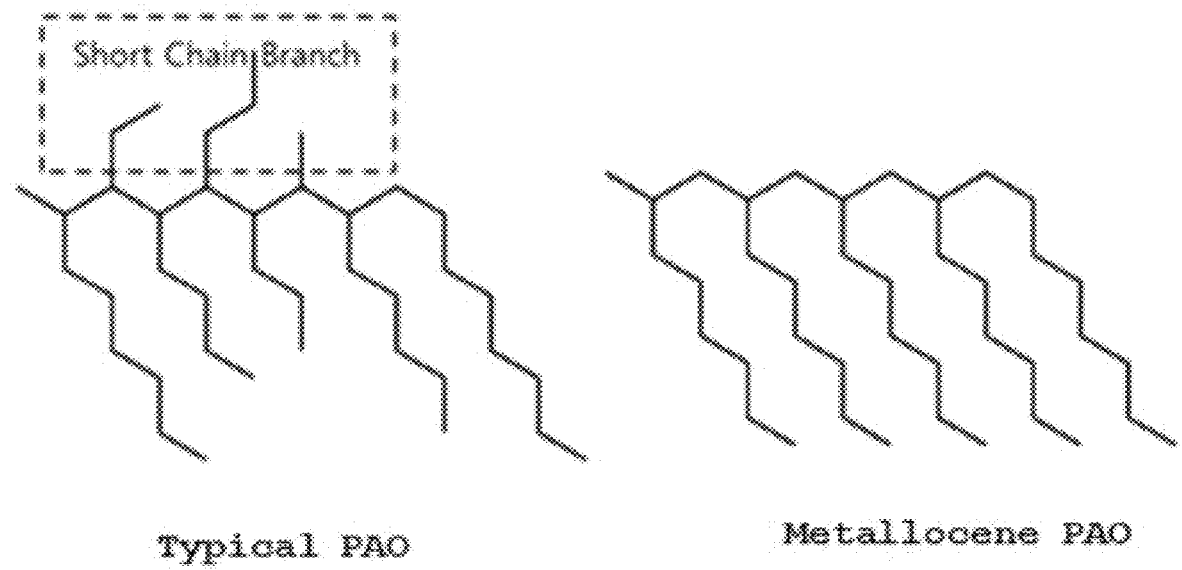
FIG. 1 shows the structure of polyalphaolefin prepared through a conventional method and the structure of polyalphaolefin prepared according to an embodiment of the present invention.
Figure 2:
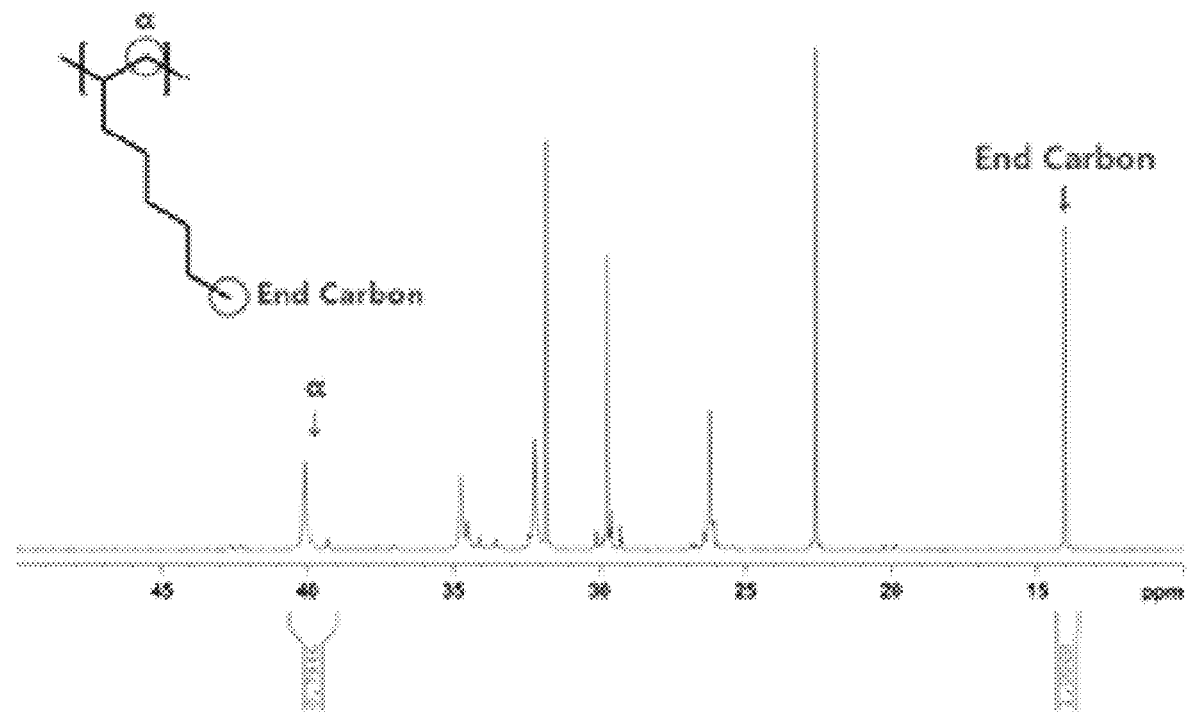
FIG. 2 is a graph showing the NMR spectrum of the polyalphaolefin prepared according to an embodiment of the present invention.

Hereinafter, a detailed description will be given of the preferred embodiments of the present invention. However, the present invention is not limited to these embodiments, but may be modified in other forms. These embodiments are provided in order to fully convey the spirit of the present invention to those skilled in the art so that the contents introduced herein are thorough and complete.

Examples 1 to 8 and Comparative Examples 1 to 5: Preparation of Polyalphaolefin

Example 1

1. Preparation of Catalyst Solution 200 ml of a catalyst solution was prepared by mixing 0.3 mmol of dimethylsilylene bis(tetrahydroindenyl) zirconium dichloride, 0.35 mmol of N,N-dimethylanilinium tetrapentafluorophenylboron, 20 mmol of triisobutylaluminum and toluene in a nitrogen-purged glass flask.

2. Polymerization 1100 ml of 1-octene was placed in a nitrogen-purged stainless steel autoclave, the temperature of the reaction system was elevated to 79° C., and then 30 ml of the catalyst solution prepared above was added thereto. Subsequently, 200 g/hr of 1-octene, 50 g/hr of hexane and 0.3 ml/min of the catalyst solution were continuously fed and polymerization was initiated with stirring at 1600 rpm. Thereafter, a temperature of 79° C. and a pressure of 6 KG were maintained to afford a polymer. Thereafter, the polymer solution thus obtained was discharged continuously through a back-pressure regulator and mixed with a 1 M sodium hydroxide aqueous solution to thus deactivate the same.

3. Treatment after Polymerization

The sodium hydroxide aqueous solution was removed from the mixture of the polymer solution and the sodium hydroxide aqueous solution, after which the impurities in the polymer solution were extracted using distilled water and removed. Next, the polymer solution was concentrated for 30 min at 100° C. under reduced pressure and dried for 30 min at 240° C. under reduced pressure, after which heavy oligomers, from which unreacted monomers and low-molecular-weight oligomers were removed, were hydrogenated, yielding a polyalphaolefin.

Examples 2 to 5

Polyalphaolefins were prepared in the same manner as in Example 1, with the exception that the reaction temperature during the polymerization was changed as shown in Table 1 below.

Example 6

A polyalphaolefin was prepared in the same manner as in Example 1, with the exception that the polymerization was performed using 1-decene at a polymerization temperature of 68° C.

Example 7

A polyalphaolefin was prepared in the same manner as in Example 1, with the exception that the polymerization was performed using a mixture of 80 wt % of 1-octene and 20 wt % of 1-hexene at a polymerization temperature of 69° C.

Example 8

A polyalphaolefin was prepared in the same manner as in Example 1, with the exception that the polymerization was performed using a mixture of 80 wt % of 1-octene and 20 wt % of 1-decene at a polymerization temperature of 69° C.

Comparative Examples 1 to 5

Polyalphaolefins were prepared in the same manner as in Example 1, with the exception that the reaction temperature during the polymerization was changed as shown in Table 1 below.

TABLE 1

| | Material used | Reaction temperature (° C.) |
|---|---|---|
| Example 1 | 1-octene | 85 |
| Example 2 | 1-octene | 72 |
| Example 3 | 1-octene | 66 |
| Example 4 | 1-octene | 61 |
| Example 5 | 1-octene | 57 |
| Example 6 | 1-decene | 68 |
| Example 7 | 80 wt % of 1-octene and 20 wt % of 1-hexene | 69 |
| Example 8 | 80 wt % of 1-octene and 20 wt % of 1-hexene | 69 |
| Comparative Example 1 | 1-octene | 105 |
| Comparative Example 2 | 1-octene | 95 |
| Comparative Example 3 | 1-octene | 43 |
| Comparative Example 4 | 1-octene | 41 |
| Comparative Example 5 | 1-octene | 38 |

Evaluation Example 1: Evaluation of Properties

The properties of the polyalphaolefins prepared in Examples 1 to 8 and Comparative Examples 1 to 5 were measured through the following methods. The results are shown in Table 2 below.

Evaluation Example 1-1: Molecular Weight Distribution

Molecular weight distribution was measured using GPC (VE2001, Viscotek). Upon GPC measurement, a PLgel 5 μm Mixed-D column having an inner diameter of 7.5 mm and a length of 300 mm was used, the measurement temperature was 35° C., and the mobile phase was tetrahydrofuran (THF, Burdick and Jackson, HPLC grade). The mobile phase was supplied at a rate of 1 ml/min, the sample concentration was 9.26 wt %, and the amount of the sample that was added was about 100 μm. A differential refractometer was used as a detector, and the peaks were separated by data processor OmniSEC 4.6 (manufactured by Viscotek).

Evaluation Example 1-2. Kinematic Viscosity of Polymer at 100° C.

The kinematic viscosity at 100° C. was measured in accordance with ASTM D 445 using Lauda PV15, Japan.

Evaluation Example 1-3. Viscosity Index

The viscosity index was measured in accordance with ASTM D 2270.

Evaluation Example 1-4. Pour Point

The low-temperature pour point was measured in accordance with ASTM D 6749 using a Tanaka Science MPC 102L, Japan (oil temperature: −40° C.).

Evaluation Example 1-5. Flash Point

The flash point was measured through a Cleveland open-cup method in accordance with ASTM D 92.

Evaluation Example 1-6. End Carbon/α Carbon Ratio $^{13}$C NMR was measured at room temperature using an AVANCE III 500 MHz NMR spectrometer equipped with a BBO probe, made by Bruker. All spectra were processed and visualized using Topspin 2.1 (an NMR program from Bruker).

Specifically, inverse gated decoupling pulses were used as a pulse program for quantitative analysis. In the pulse program, the relaxation delay time was 10 sec, the free induction decay acquisition time was 0.8 sec, and the S/N (signal to noise) value was 1,000 or more. The measured $^{13}$C NMR spectrum showed the end carbon/a carbon ratio as the relative ratio of integrals at 40 to 42 ppm for a carbon and 14 to 16 ppm for end carbon based on chloroform (77 ppm).

Evaluation Example 1-7. Bromine Index

The bromine index was measured in accordance with ASTM D1559.

Evaluation Example 1-8. Metal Content

The concentration of the metal component in the polyalphaolefin was analyzed through ICP (Inductively Coupled Plasma) spectroscopy.

TABLE 2

|  | Molecular weight distribution (Mw/Mn) | Kinematic viscosity at 100° C. (cSt) | Viscosity index | Pour point (° C.) | Flash point (° C.) | End carbon/α carbon | Bromine index | Yield (%) | Metal content (ppm) |
|---|---|---|---|---|---|---|---|---|---|
| Example 1 | 1.2 | 10 | 146 | −57 or less | 246 | 2.65 | 0.1 or less | 85 | 5 or less |
| Example 2 | 1.5 | 40 | 170 | −45 | 266 | 1.62 | 0.1 or less | 87 | 5 or less |
| Example 3 | 1.53 | 65 | 181 | −42 | 270 | 1.47 | 0.1 or less | 89 | 5 or less |
| Example 4 | 1.62 | 100 | 193 | −39 | 270 | 1.38 | 0.1 or less | 90 | 5 or less |
| Example 5 | 1.7 | 150 | 205 | −37 | 276 | 1.32 | 0.1 or less | 87 | 5 or less |
| Example 6 | 1.46 | 38.3 | 182 | −42 | 278 | 1.58 | 0.1 or less | 90 | 5 or less |
| Example 7 | 1.46 | 38.1 | 163 | −48 | 272 | 1.45 | 0.1 or less | 89 | 5 or less |
| Example 8 | 1.48 | 38.5 | 173 | −49 | 276 | 1.46 | 0.1 or less | 88 | 5 or less |
| Comparative Example 1 | 1.09 | 4 | 127 | −60 or less | 222 | 9.21 | 0.1 or less | 40 | 5 or less |
| Comparative Example 2 | 1.18 | 6 | 146 | −60 or less | 228 | 4.56 | 0.1 or less | 60 | 5 or less |
| Comparative Example 3 | 2.02 | 300 | 235 | −32 | 293 | 1.25 | 0.1 or less | 90 | 5 or less |
| Comparative Example 4 | 2.09 | 350 | 242 | — | — | 1.24 | 0.1 or less | 89 | 5 or less |
| Comparative Example 5 | 2.1 | 450 | 248 | — | — | 1.1 | 0.1 or less | 90 | 5 or less |

As is apparent from Table 2, the polyalphaolefins prepared in Examples 1 to 5 exhibited an end carbon/α carbon ratio of 2.7 or less compared to Comparative Examples 1 and 2. Moreover, in the case of polyalphaolefins prepared in Examples 6 to 8 using different kinds of single alphaolefin or various alphaolefin mixtures, it was confirmed that the end carbon/α carbon ratio was superior, as in Example 1 to 5. Accordingly, the polyalphaolefins of Examples 1 to 8 were found to suppress the formation of short chain branches compared to Comparative Examples 1 and 2.

In the case of the polyalphaolefins prepared in Comparative Examples 3 to 5, the end carbon/α carbon ratio was superior, but the kinematic viscosity and pour point were found to be very large compared to Examples 1 to 8. Accordingly, the polyalphaolefins of Comparative Examples 3 to 5 were found to be unsuitable for use as lubricants because of the very low fluidity thereof.

Moreover, it can be confirmed that the polyalphaolefins prepared in Examples 1 to 8 have almost no residual unsaturated double bonds because bromine numbers thereof are 0.1 or less, indicative of high chemical stability, thereby preventing the formation of foreign substances and yellowing.

In addition, it can be confirmed that the polyalphaolefins prepared in Examples 1 to 8 have a metal content of 5 ppm or less, indicating that there is almost no residual metal, thereby preventing deterioration of product quality.

Although preferred embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. A polyalphaolefin, which is a hydrogenated polyalphaolefin composition comprising at least one hydrogenated alphaolefin oligomer, the polyalphaolefin having a weight average molecular weight (Mw) of 15,000 or less and a molecular weight distribution (Mw/Mn) of 2.0 or less and satisfying Expression (1) below:

$$1.3 < \text{end carbon}/\alpha \text{ carbon} \leq 2.7 \quad (1)$$

wherein an end carbon/α carbon ratio represents a relative ratio of integrals at 14 to 16 ppm and 40 to 42 ppm in a $^{13}$C NMR spectrum, and wherein the α carbon is a carbon atom of a $CH_2$ group in a backbone chain of the at least one hydrogenated alphaolefin oligomer, and the end carbon is a carbon atom of a $CH_3$ end group in a side chain of the at least one hydrogenated alphaolefin oligomer.

2. The polyalphaolefin of claim 1, satisfying Expression (3) below $$1.3 \leq \text{end carbon}/\alpha \text{ carbon} \leq 1.7 \quad (3).$$

3. The polyalphaolefin of claim 1, wherein the polyalphaolefin has a kinematic viscosity at 100° C. of 200 cSt or less.

4. The polyalphaolefin of claim 1, wherein the polyalphaolefin has a pour point of −35° C. or less and a flash point of 230° C. or more.

5. The polyalphaolefin of claim 1, wherein the polyalphaolefin has a residual metal content of 5 ppm or less.

6. The polyalphaolefin of claim 1, wherein the polyalphaolefin is prepared by polymerizing a C6-C20 alphaolefin using a catalyst composition comprising a metallocene compound, an organometallic compound and an organoboron compound.

7. The polyalphaolefin of claim 6, wherein the alphaolefin is any one or a mixture of two or more selected from the group consisting of 1-hexene, 1-octene, 1-nonene, 1-decene, 1-undecene, 1-dodecene, 1-tricene, 1-tridecene, 1-tetradecene, 1-pentadecene, 1-hexadecene, 1-heptadecene, 1-octadecene, 1-nonadecene and 1-eicosene.

* * * * *